US010514694B1

(12) United States Patent
Mundhenk et al.

(10) Patent No.: US 10,514,694 B1
(45) Date of Patent: Dec. 24, 2019

(54) SYSTEM AND METHOD FOR CLASSIFYING AGENTS BASED ON AGENT MOVEMENT PATTERNS

(71) Applicant: HRL Laboratories, LLC, Malibu, CA (US)

(72) Inventors: Terrell N. Mundhenk, Dublin, CA (US); Heiko Hoffmann, Simi Valley, CA (US)

(73) Assignee: HRL Laboratories, LLC, Malibu, CA (US)

( * ) Notice: Subject to any disclaimer, the term of this patent is extended or adjusted under 35 U.S.C. 154(b) by 188 days.

(21) Appl. No.: 15/216,560

(22) Filed: Jul. 21, 2016

Related U.S. Application Data

(60) Provisional application No. 62/195,282, filed on Jul. 21, 2015.

(51) Int. Cl.
*G05D 1/00* (2006.01)
*G06N 3/08* (2006.01)
*B60W 40/08* (2012.01)
*G01S 17/50* (2006.01)

(52) U.S. Cl.
CPC ........... *G05D 1/0088* (2013.01); *B60W 40/08* (2013.01); *G06N 3/088* (2013.01); *B60W 2040/0818* (2013.01); *G01S 17/50* (2013.01)

(58) Field of Classification Search
CPC .................. B60W 30/17; B60W 40/04; B60W 2050/0029; B60W 2550/408; B60W 40/08; B60W 2040/0818; G06N 3/0445; G06N 3/0454; G06N 3/008; G06N 3/049; G06N 3/088; G06K 2009/00738; G06K 9/00355; G06K 9/6269; G06T 9/002; H04N 19/51; H04N 19/587; H04N 19/593; H04N 19/82; G06F 3/0346; G06F 3/011; G06F 3/017; G06F 1/163; H04M 2250/12; G05D 1/0088; G01S 17/50
USPC .......................................................... 701/96
See application file for complete search history.

(56) References Cited

U.S. PATENT DOCUMENTS

| 2014/0005906 | A1* | 1/2014 | Pandita ................. B60W 30/17 701/96 |
| 2015/0073662 | A1* | 3/2015 | Schmudderich ......... B62D 6/00 701/41 |

OTHER PUBLICATIONS

O. C. Jenkins, M. J. Matarić, and S. Weber. Primitive-Based Movement Classification for Humanoid Imitation. Proceedings, First IEEE-RAS International Conference on Humanoid Robotics (Humanoids), 2000, pp. 1-18.

(Continued)

*Primary Examiner* — Nga X Nguyen
(74) *Attorney, Agent, or Firm* — Tope-McKay & Associates

(57) ABSTRACT

Described is a system and method for the classification of agents based on agent movement patterns. In operation, the system receives position data of a moving agent from a camera or sensor. Motion data of the moving agent is then extracted and used to generate a predicted future motion of the moving agent using a set of pre-calculated Echo State Networks (ESN). Each ESN represents an agent classification and generates a predicted future motion. A prediction error is generated for each ESN by comparing the predicted future motion for each ESN with actual motion data. Finally, the agent is classified based on the ESN having the smallest prediction error.

18 Claims, 10 Drawing Sheets

(56) References Cited

OTHER PUBLICATIONS

A. Fod, M. J. Mataric, and O. C. Jenkins. Automated Derivation of Primitives for Movement Classification, Autonomous Robots, 12(1), pp. 39-54, 2002.

H. Jaeger, "Adaptive nonlinear system identification with echo state networks," in NIPS, 2003, pp. 593-600.

S. Hellbach, J. P. Eggert, E. Korner, and H.-M. Gross, "Time Series Analysis for Long Term Prediction of Human Movement Trajectories," in ICONIP, 2008, pp. 567-574.

J. Unkelbach, S. Yi, and J. Schmidhuber, "An EM based training algorithm for recurrent neural networks," in ICANN, 2009, pp. 964-974.

G. Holzmann and H. Hauser, "Echo State Networks with filter neurons and a delay and sum readout," Neural Networks, vol. 23, pp. 244-256, 2010.

D. Shutin, C. Zechner, S. R. Kulkarni, and H. V. Poor, "Regularized Variational Bayesian Learning of Echo State Networks with Delay & Sum Readout," Neural Computation, vol. 24, pp. 967-995, 2012.

A. P. Dempster, N. M. Laird, and D. B. Rubin, "Maxmimum Likelihood from incomplete data via EM algorithm," Journal of the Royal Statistical Society B, vol. 39, pp. 1-38, 1977.

G. Veres, H. Grabner, L. Middleton, and L V. Gool, "Automatic Workflow Monitoring in Industrial Environments," in ACCV, 2010, pp. 1-14.

H. Akaike, "A new look at the statistical model identification," IEEE Transactions on Automatic Control, vol. 19, pp. 116-723, 1974.

C. Cortes and V. N. Vapnik, "Support-Vector Networks", Machine Learning, 20, 1995, pp. 1-31.

N. Dalal and B. Triggs, "Histograms of Oriented Gradients for Human Detection," in CVPR, San Diego, CA, 2005, pp. 1-8.

LibSVM. Available at www.csie.ntu.edu.tw/~cjlin/libsvm/. Downloaded Oct. 10, 2016.

TORCS Available at torcs.sourceforge.net/. Downloaded Oct. 10, 2016.

Bolme, D.S., Beveridge, J.R., Draper, B.A., Lui, Y.M.: Visual object tracking using adaptive correlation filters. In: CVPR (2010), pp. 2544-2550.

\* cited by examiner

US 10,514,694 B1

SYSTEM AND METHOD FOR CLASSIFYING AGENTS BASED ON AGENT MOVEMENT PATTERNS

CROSS-REFERENCE TO RELATED APPLICATIONS

This is a non-provisional patent application of 62/195,282, filed on Jul. 21, 2015, the entirety of which is hereby incorporated by reference.

BACKGROUND OF INVENTION

(1) Field of Invention

The present invention relates to a classification system and, more particularly, to a classification system that classifies an agent based on movement patterns of the agent.

(2) Description of Related Art

The ability to automatically classify an object or agent is desirable in many fields. For example, in the automotive field and autonomous vehicles, it is desirable to be able to automatically judge the internal state (of the driver) of a car in front of the autonomous car. Based on this judgment, the autonomous car can then take precautionary measures, e.g., keep an extra safety distance. Within the field of the classification of a type of vehicular agent, the prior art makes extensive use of primitive-based movement classification (See the List of Incorporated Literature References, Literature Reference Nos. 1 and 2). With respect to such methods, the identification apparatus has a library of movement primitives and observed movements are matched against patterns in the library. There are a number of limitations, however, to this approach, the most prominent being that an observed movement needs to be appropriately segmented such that it can be matched against corresponding movements in the library.

Researchers have previously used Echo State Networks (ESNs) (see Literature Reference No. 3) to predict time series (see Literature Reference No. 4). The ESNs are trained to approximate the underlying ordinary differential equation (ODE) that generates the observed data. As such, the ESN method is limited to data generated from an ODE, and likely fails if the data have more variability. Generally, ESNs need to be fine-tuned to each problem.

Recently, ESNs have been linked with a probabilistic framework to set parameters within the ESN (see Literature References 5, 6 and 7). However, this approach has been also limited by its using only a single ESN, which renders it incapable of dealing well with variability in the observed data.

Thus, a continuing need exists for a system and method that can classify an agent on the basis of its movement, without the limitations inherent to the prior art as disclosed above.

SUMMARY OF INVENTION

This disclosure provides a system for classifying agents based on agent movement patterns. The system comprises one or more processors and a memory. The memory is, for example, a non-transitory computer-readable medium having executable instructions encoded thereon, such that upon execution of the instructions, the one or more processors perform several operations, including: receiving position data of a moving agent; extracting motion data of the moving agent from the position data; generating a predicted future motion of the moving agent using a set of recurrent neural networks, each recurrent neural network representing an agent classification and generating a predicted future motion; generating a prediction error for each recurrent neural network by comparing the predicted future motion for each recurrent neural network with actual motion data; and classifying the agent based on the recurrent neural network having a smallest prediction error.

In another aspect, a sensor is included for generating position data of the moving agent, the sensor being selected from a group comprising a camera and a LASER range finder.

Further, the agent is classified using a classifier, the classifier operating on prediction errors of an agent's movement evaluated over a series of time intervals.

In another aspect, generating the prediction error and classifying the agent further comprises operations of: generating, for an instant in time, a root mean squared error (RMSE) value over varying window sizes for each recurrent neural network; generating a tensor product of all the RMSE values over all time slices; passing the tensor product through the support vector machine to generate votes for each recurrent neural network; and accumulating the votes for a block of time to generate a model score for each recurrent neural network, such that when the model score for any particular recurrent neural network exceeds a predetermined threshold, the agent is classified based on the recurrent neural network having the largest model score In yet another aspect, each recurrent neural network is trained on sample movements of an agent.

Additionally, each recurrent neural network is an Echo State Network (ESN).

Further, each recurrent neural network is trained with an Expectation Maximization (EM) process, the EM process comprising operations of: computing the prediction error of each recurrent neural network (e.g., ESN) for each input sample (i.e., each input sample having motion pre-classified as an agent type); computing a score for each recurrent neural network based on a goodness of its prediction and penalizing against a goodness of predictions of other recurrent neural networks for each input sample; and optimizing parameters of the recurrent neural networks based on the computed scores to associate the ESN models with the agent types.

In yet another aspect, the system is implemented in an autonomous vehicle with at least one recurrent neural network being associated with an impaired driver classification, such that if the agent is classified as an impaired driver, the system causes the autonomous vehicle to initiate a precautionary protocol.

Further, each recurrent neural network is trained with an Expectation Maximization (EM) process, and wherein the EM process further optimizes a number of recurrent neural networks describing each class of movement patterns.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
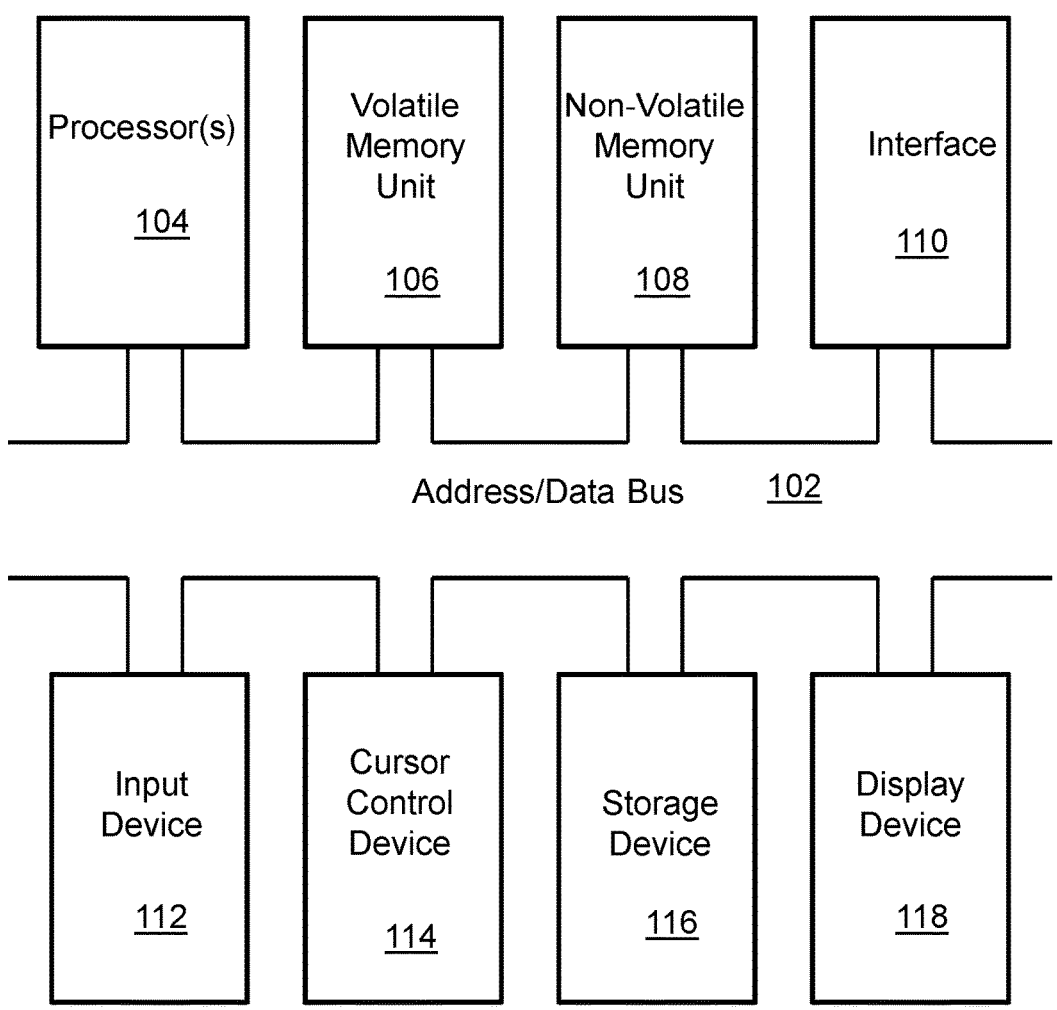
FIG. 1 is a block diagram depicting the components of a system according to various embodiments of the present invention.

The present invention relates to a classification system and, more particularly, to a classification system that classifies an agent based on movement patterns of the agent. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph Before describing the invention in detail, first a list of incorporated references is provided. Next, a description of the various principal aspects of the present invention is provided. Subsequently, an introduction provides the reader with a general understanding of the present invention. Finally, specific details of various embodiment of the present invention are provided to give an understanding of the specific aspects.

(1) List of Incorporated Literature References

The following references are cited throughout this application. For clarity and convenience, the references are listed herein as a central resource for the reader. The following references are hereby incorporated by reference as though fully set forth herein. The references are cited in the application by referring to the corresponding literature reference number as follows:

1. O. C. Jenkins, M. J. Matarić, and S. Weber. Primitive-Based Movement Classification for Humanoid Imitation. Proceedings, First IEEE-RAS International Conference on Humanoid Robotics (Humanoids), 2000.
2. A. Fod, M. J. Mataric, and O. C. Jenkins. Automated Derivation of Primitives for Movement Classification, Autonomous Robots, 12(1), pp. 39-54, 2002.
3. H. Jaeger, "Adaptive nonlinear system identification with echo state networks," in NIPS, 2003, pp. 593-600.
4. S. Hellbach, J. P. Eggert, E. Körner, and H.-M. Gross, "Time Series Analysis for Long Term Prediction of Human Movement Trajectories," in ICONIP, 2008.
5. J. Unkelbach, S. Yi, and J. Schmidhuber, "An EM based training algorithm for recurrent neural networks," in ICANN, 2009.
6. G. Holzmann and H. Hauser, "Echo State Networks with filter neurons and a delay and sum readout," Neural Networks, vol. 23, pp. 244-256, 2010.
7. D. Shutin, C. Zechner, S. R. Kulkarni, and H. V. Poor, "Regularized Variational Bayesian Learning of Echo State Networks with Delay & Sum Readout," Neural Computation, vol. 24, pp. 967-995, 2012.
8. A. P. Dempster, N. M. Laird, and D. B. Rubin, "Maxmimum Likelihood from incomplete data via EM algorithm," *Journal of the Royal Statistical Society B*, vol. 39, pp. 1-38, 1977.
9. G. Veres, H. Grabner, L. Middleton, and L. V. Gool, "Automatic Workflow Monitoring in Industrial Environments," in *ACCV*, 2010.
10. H. Akaike, "A new look at the statistical model identification," IEEE Transactions on Automatic Control, vol. 19, pp. 716-723, 1974.

11. C. Cortes and V. N. Vapnik, "Support-Vector Networks", Machine Learning, 20, 1995.
12. N. Dalal and B. Triggs, "Histograms of Oriented Gradients for Human Detection," in CVPR, San Diego, Calif., 2005.
13. LibSVM. Available at www.csie.ntu.edu.tw/~cjlin/libsvm/.
14. TORCS Available at torcs.sourceforge.net/.
15. Bolme, D. S., Beveridge, J. R., Draper, B. A., Lui, Y. M.: Visual object tracking using adaptive correlation filters. In: CVPR (2010).

(2) Principal Aspects

Various embodiments of the invention include three "principal" aspects. The first is a system for the classification of an agent on the basis of its movement pattern. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
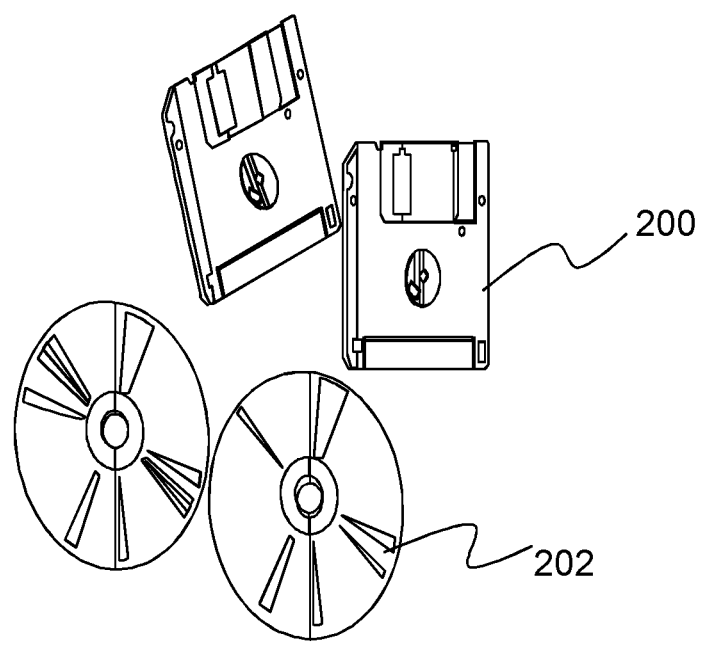
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Introduction

This disclosure provides a classification system to automatically classify an agent (e.g., a car driven by a sober or drunken person) based on the agent's movement pattern. The invention includes a recording or motion tracking device to monitor the movement of the agent. For example, the recording or motion tracking device can be a camera recording the movement of the car in front or a laser range finder device to find the position of the agent or object. Machine learning is then used to train a set of recurrent neural networks (e.g., Echo State Networks) in an Expectation Maximization (probabilistic) framework to create generative models, which can then predict the movements of the agent. Based on these predictions, the invention then classifies the type of agent (e.g., sober or drunken driver, etc.).

As can be appreciated, the ability to automatically classify an agent based on the agent's movement pattern can be implemented in a variety of systems. As a non-limiting example, the system as described herein can be incorporated into autonomous cars to enhance the capabilities of such cars by being able to judge the internal state (of the driver) of a car in front of the autonomous car. Based on this judgment or classification, the autonomous car can then be caused to initiate a precautionary protocol and take precautionary measures (e.g., increase the distance between itself and the vehicle in front of the autonomous car by braking or decelerating, alert passengers (via audio or light alerts, etc.), call the police, etc.). As another non-limiting example, the system can be used to provide for classification of unmanned aerial vehicles (UAVs) based on their flying patterns which enables the deployment of counter measures. Specific details regarding the present invention are provided below.

(4) Specific Details of Various Embodiments

Figure 3:
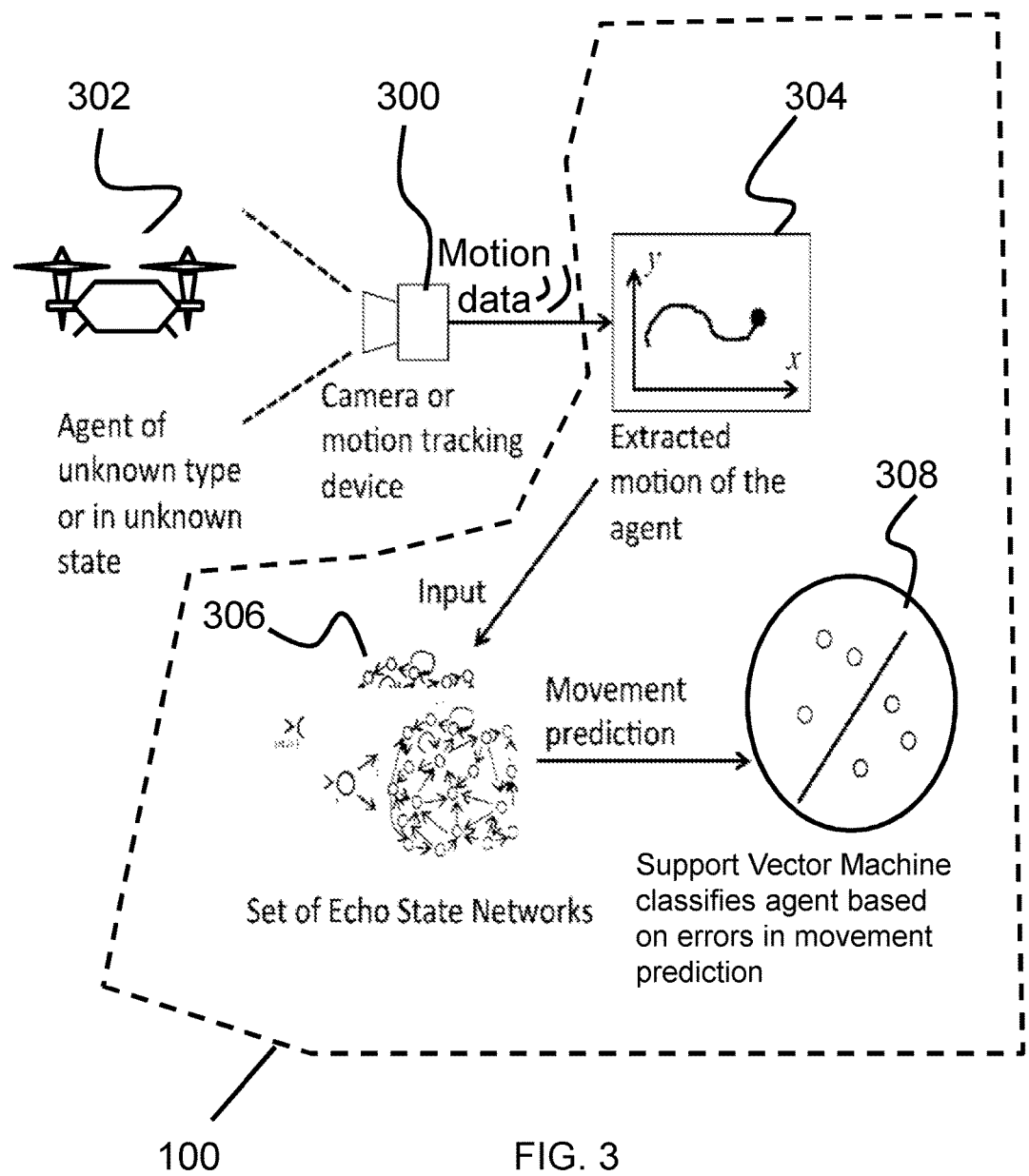
FIG. 3 is a diagram depicting elements of a system according to various embodiments of the present invention.

The present invention is directed to a system and method of identifying agents (e.g., cars or UAVs) based on their movement patterns. As shown in FIG. 3, the system includes a camera 300 or other suitable device (e.g., LASER range finder) to generate motion data of an observed agent 302. Using the information from the camera 300 or other suitable device, the system extracts the motion 304 in 2D or 3D using any suitable object tracking algorithm, a non-limiting example of which was described in Literature Reference No. 15. The extracted motion is then provided to a set of Echo State Networks (ESNs as described below) 306 to predict future motion. The predicted motion is then compared with actual data (using, for example, a support vector machine (SVM)) and based on the prediction error, the system classifies 308 the agent according to the best matching ESN. For example, the SVM classifies the agent based on errors in movement prediction. Before the apparatus can be used for prediction and classification, the set of ESNs is trained on separate data using the probabilistic Expectation Maximization framework (or other suitable method), as explained below.

With respect to the present invention, the approach is to create generative models of the behavior of agents. Echo State Network (ESN) models (see Literature Reference No. 3) are generative (i.e., the model's application produces a time series of movements that can be compared with observation). ESNs are known to those skilled in the art and provide an architecture and supervised learning principle for recurrent neural networks (RNNs). Prior studies have shown good utility in using ESNs to predict complex human behavior (see Literature Reference No. 4). Here, a multitude of ESNs are created by using the Expectation Maximization (EM) (see Literature Reference No. 8) algorithm to determine a configuration of ESN models that optimally cover the observed training data. Each ESN model observes incoming data such as a car position and makes a prediction about its future position. The models are trained on a specific agent type. Thus, they are biased towards this type and better able to predict its behavior. Models trained on other types of agents predict the wrong behavior and show a greater degree of error. By measuring the degree of error of the ESN models, it can be determined which one is the best match for the observed behavior. Furthermore, the model with the lowest degree of error can then be used to make reasonable estimations for an autonomous device to help it learn to cope with the agent it is observing.

In general, the system and method of this disclosure operates by creating a small set of ESNs to predict the action of agents. As a frame of reference, the present invention must begin with sets of training data for the types of actors that are of the desired fit. ESNs are used to determine what kind of driver is being observed and make predictions about the path of the car. To use the ESNs to label the agent, model sets are created for each type of driver, e.g., a model set for sober drivers and a model set for impaired drivers. By manually specifying sets like this, an agent can be labeled. The EM method then determines the hidden types as a subset of the types specified; e.g., it creates four impaired models and two sober driver models. By using the EM algorithm, the overlap in information between each model within a type is reduced.

To make a prediction about the type of agent from the generative models, the degree of error between the model prediction and observation is fed into a classification method, such as a Support Vector Machine (SVM). The SVM is trained on the observed prediction error to determine which type of model is the best fit and label the agent accordingly. Thus, the ESN models act as preprocessors for an SVM machine learner for the task of labeling the agents' behavior. In the following, details are offered on the use of Echo State Networks, Expectation Maximization, and classification. Thereafter, a test of the present invention is provided in a computer simulation.

(4.1) Echo State Networks

Figure 4:
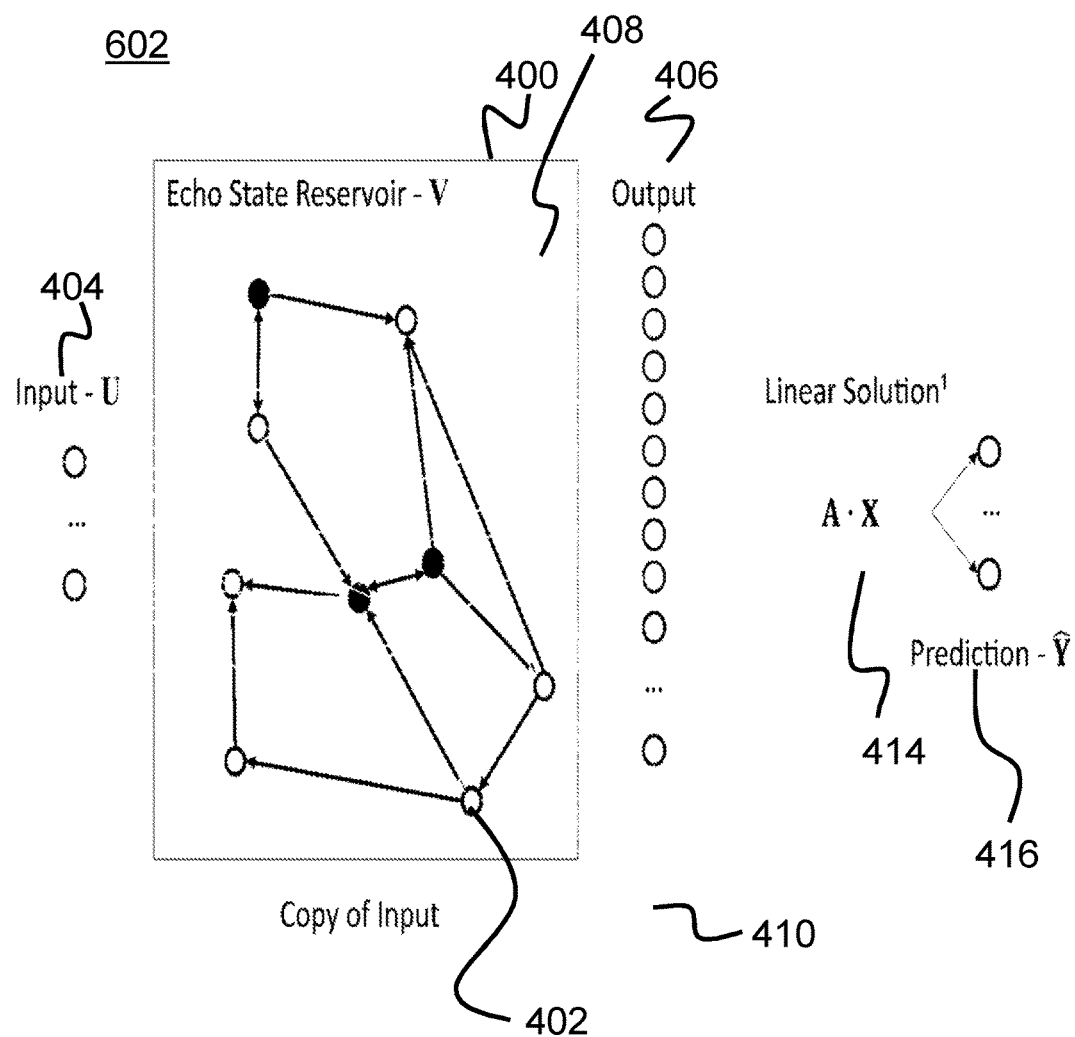
FIG. 4 shows a visual representation of an Echo State Network (ESN) model according to various embodiments of the present invention.

At the core of the solution to the problem as solved according to the principals of the present invention are sets of echo state networks. An ESN (See Literature Reference No. 3) allows a machine learner to learn temporal order of events with a black box set of interconnected neurons called a reservoir 400 (see FIG. 4 for an example). More specifically, FIG. 4 provides a visual representation of an ESN model 602. On the left are sets of input values (data 404). These values are fed into the network reservoir 400 which acts as a non-linear memory and is essentially a temporal kernel for a machine learner. The outputs 406 are the activations of the ESN neurons 402. Notice that the output box also includes the input (raw data 410 of input values). The output values 406 from the ESN are used to train a machine learner 414. So given the state of the neurons 402 in the ESN, the system can predict 416 the value of some target. The linear solution (of the machine learner 414) must be trained to do this prediction. The base ESN is not trained since it acts like a kernel preprocess.

In other words, the neurons 402 in the reservoir 400 do not do any learning, but instead act like a recurrent online memory. Data 404 is pushed into the reservoir 400, which then bounces around between neurons 402. A typical ESN model 602 has recurrent connections from the output back to the internal reservoir; however, the present invention does not make use of such a scheme. Instead, there are two parts of the output 406: first, the values 408 of the states for each neuron 402 and, second, the raw input values 410. These values are fed into a machine learner that models the target data. The standard ESN (for example, see Literature Reference No. 9) uses a perceptron 414 as the machine learner to create the learned output. Thus, the input to the perceptron 414 is the full state of all the neurons 402 in the ESN plus the raw data 410 at that moment. It is conventional to train the machine learner over all the data from all moments in time. Thus, the outputs 406 from the ESN for each instance of time are stacked, and the linear solution is computed at once.

In general, an ESN model 602 can best be understood by looking at its activation weights in the reservoir 400. The activation is made up of three vector components:

1. All raw inputs U times weights at time t.
2. All observed outputs Y at the last time frame times weights at time i−1.
3. The activation of all reservoir neurons V that connect to this neuron at k times weights at time t−1.

Thus, for the kth reservoir neuron v, its activation can be given as:

$$v^k = f(U_t \cdot \alpha^k + \hat{Y}_{t-1} \cdot \beta^k + V_{t-1} \cdot \gamma^k) \quad (1)$$

where $f$ is a sigmoid transfer function. Its output is a single scalar value between −1 to 1.

$$f = \tan h(\varphi) \quad (2)$$

The term $\hat{Y}_{t-1}$ is the observed output. During training, this is the ground truth target value. The system of this disclosure does not use recurrence with output decisions in the solution exemplified by the system, so this component is always zero. $V_{t-1}$ are the inputs from other reservoir neurons. The randomized weight matrices are given as $\alpha^k$, $\beta^k$ and $\gamma^k$. The connection weights $\gamma^k$ are sparse, so most neurons are not connected to neuron k. The neuron at k may recurrently connect to itself. Note that each of the k neurons receives some input from the raw observations. However, the associated weights can be very small or negative; hence, the interactions can be highly varied. The implication is that inputs to the ESN model 602 can create both inhibitory as well as excitatory activity; the ESN model 602 by itself is a memory and not a learner, while the machine learner is attached to the ESN model 602. Thus, the ESN model 602 can be thought of as being a recurrent temporal kernel transformation for a machine learner.

(4.1.1) Variable Leaky Integration

The present invention takes advantage of the fact that the state of neurons used to hold information for a period of time can be augmented. As understood by those skilled in the art, a leaky integrator neuron model can be used to hold memory in the ESN reservoir. With respect to the present invention, the neuron model is augmented by making the leak variable. Thus, neuron memories are allowed to explicitly vary in duration. A neuron with a weaker leak will hold values much longer than a neuron with a stronger leak. Here, k denotes each reservoir neuron. The activation v of a reservoir neuron k at time t is given as:

$$v_t^k = \frac{l^k \cdot \tau \cdot v_{t-1}^k + \tau \cdot f(U_t \cdot \alpha^k + \hat{Y}_{t-1} \cdot \beta^k + V_{t-1} \cdot \gamma^k)}{l^k \cdot \tau + \tau} \quad (3)$$

Here, $l^k$ is the leak for this neuron and $\tau$ is a time constant set the same for all reservoir neurons. The randomized weight matrices are given as $\alpha^k$, $\beta^k$ and $\gamma^k$. Since the neuron weights are random, the leaks can be set directly. For example, to set the leak between 2 and 17 for all N reservoir neurons where $k \in \{1, \ldots N\}$, it could be computed that:

$$l^k = 2 + 15 \cdot \left(\frac{k}{N}\right). \quad (4)$$

As a note, equation (3) is not a leaky integrator per se, and resembles strongly a cumulative moving average.

(4.1.2) Training the Output Layer

The input to the machine learner at any moment t is the activation state of the reservoir neurons plus the raw input data. Accordingly, if there are 400 reservoir neurons, there will be 400 scalar activations. The machine learner works independently of the ESN itself during the training phase. V is defined as the activations of k neurons in the reservoir from time t to time t+n, as follows:

$$V = \begin{bmatrix} v_t^1 & \cdots & v_{t+n}^1 \\ \vdots & \ddots & \vdots \\ v_t^k & \cdots & v_{t+n}^k \end{bmatrix}. \quad (5)$$

The raw inputs U are the i-dimensional inputs to the ESN, as follows:

$$U = \begin{bmatrix} u_t^1 & \cdots & u_{t+n}^1 \\ \vdots & \ddots & \vdots \\ u_t^j & \cdots & u_{t+n}^j \end{bmatrix}. \quad (6)$$

The target value(s) are denoted as Y, as follows:

$$Y = \begin{bmatrix} y_t^1 & \cdots & y_{t+n}^1 \\ \vdots & \ddots & \vdots \\ y_t^j & \cdots & y_{t+n}^j \end{bmatrix}. \quad (7)$$

The input to the learner is a vertical concatenation of V and U. Thus, the purpose is to find some process that will reliably yield Y given V and U. The standard ESN uses a perceptron to do this. For shorthand, X is defined as the concatenated input, as follows:

$$X = \begin{bmatrix} V \\ U \end{bmatrix}. \quad (8)$$

The set of weights A for a linear transform is defined as:

$$A = \text{pseudoinverse}(X, Y) \quad (9)$$

Thus, the expected output is $$\hat{Y} = A \cdot X. \quad (10)$$

Particularly for the multi-model expectation maximization solution featured in the present invention, a weighted inverse is used, as follows:

$$A_m = (X^T \cdot w_m \cdot X)^{-1} \cdot X^T \cdot w_m \cdot Y. \quad (11)$$

The term $w_m$ is a weight vector for the model m, which controls the influence of on the solution. This will be discussed in more detail later.

(4.2) Multiple Echo State Models Via Expectation Maximization

A set of ESN models is created to fit the given data, as no one single ESN model will do a perfect job of fitting the data provided. However, a multitude of ESN models can be fit to capture the variance in the data. If it is desired, for instance, to fit the driving style of different impaired drivers, it is taken for granted that some of them may be tired, or under the influence or distracted. Depending on the specific condition and certain behavioral propensities, there may be several types of impaired drivers, which creates the need for a finite set of underlying generators for each type of impaired driver. With respect to the system described herein, an ESN model is formed to fit each type.

To approximate the number of generators, an expectation maximization (hereafter EM) method is used to try and discover a set of representative model generators. In very general terms, a set of models is good if each model describes the behavior of a subset of samples very well, but is somewhat poor at describing the behavior of samples which other model classes do well on. For example, a model that predicts the behavior of a tired driver (model type A) is good if it does very well at predicting tired drivers, but not so well at predicting drunk or distracted drivers (model type B). The EM method of the present invention has a built in ability to discover the proper number of models needed.

Figure 5:
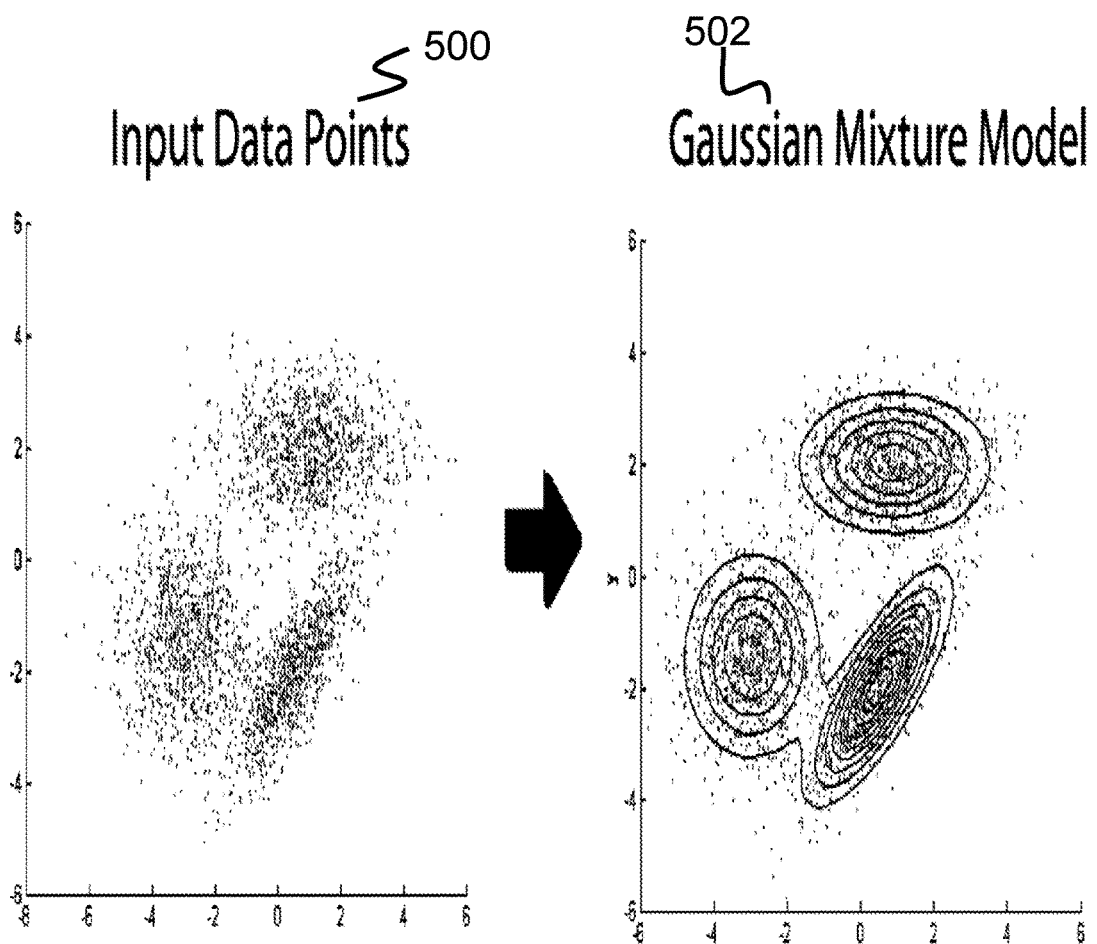
FIG. 5 shows an example of the expectation maximization (EM) method to find mixtures of Gaussians that fit some set of data points.

One of the most common ways EM is used is to create Gaussian Mixture Models (hereafter GMM), an example of which is shown in FIG. 5. More specifically, FIG. 5 depicts an example of using the EM method to find mixtures of Gaussians that fit some set of data points. Given the data on the left (i.e., input data points 500), the set of generators can be estimated that underlie the creation of the data. On the right side (in the GMM 502), the EM method has estimated that three Gaussian models fit the data well. The system according to the various embodiments of the present invention replaces the GMM's with ESN models.

The EM method usually starts with several random hypotheses. For example, the method may be used to create three random Gaussian distributions to start with. From there, it is discovered how well each model fits the data (typically called the Expectation step, hereafter E Step). In the next step, the models are updated, but the update is biased for the data based on how well each sample fits each model. Data that fit a model better have more bias in how that model is updated. This step is typically referred to as the maximization step or M-Step. The E and M steps are repeated until the overall score for fitting the data converges to a maximum. Since there may be many local maxima, EM will be run more than once with many different starting parameters as well as different numbers of models.

In the EM implementation of the present invention, only the permutations for the parameters of the least squares solution are randomized. Furthermore, the parameters for the ESN network are randomized only once and are kept constant for all permutations. Thus, all permuted model sets use the same copy of the ESN network, but different randomized starting $A_m$ models. This choice makes the weak assumption that any randomized ESN is as good as another, which results in the desirable situation of having one fewer set of random variables to deal with during EM training.

(4.2.1) Echo State Network Mixture Model—E-Step

The system and method of this disclosure builds on the idea of the GMM EM method, but replaces Gaussian models with ESN models. The largest change relates to scoring. A GMM returns a probability that is somewhat easy to interpret as a likelihood score. With a GMM, the likelihood score tells us how likely a sample is to belong to one model or another. The ESN does not return a probability like a GMM, but the error score can be interpreted from the ESN as a probability. Thus, it is asserted that a model's error for a given sample is inversely proportional to the likelihood of that model representing that sample. To fit ESN models, a commodity like Mean Squared Error (MSE) for probability is substituted. A model m output for sample j given raw inputs U is defined as follows:

$$\hat{Y}_{m,j} = \text{ESN}(U_j, m). \quad (12)$$

The MSE can then be defined as follows:

$$\varepsilon_{m,j} = \frac{\sum_{t=0}^{n} (\hat{Y}_{m,t,j} - Y_{t,j})^2}{n}. \quad (13)$$

Here, n number of data points are present in a sample for each point in time. A sample is a block of observations over time. The error applies for just one sample of frames with a single model. As an example, if three models were being tested, three values for ε_(m,j) would be derived for each sample. Thus, if there are 100 samples and three models, 300 total values for ε_(m,j) would be derived. Subsequently, this result must be converted into likelihood. MSE is inversely proportional to the log-likelihood, as follows:

$$L_{m,j} = \frac{1}{\epsilon + \varepsilon_{m,j}}. \quad (14)$$

Here, $\epsilon$ is a very small number added to avoid divisions by zero. In this case it is $\epsilon=1.192092896 \cdot 10^{-7}$ (a.k.a FLT_EP-SILON). Next, the system determines which likelihood score is maximal for all the n models:

$$L\,max_j = max(L_{1,j} \ldots L_{n,j}). \quad (15)$$

It is desired to determine how good this model is in relation to how bad other models are. Thus, a means is used to penalize against the goodness of other models, $$ll_j = L\,max_j - \log\left[\sum_{i=0}^m e^{L_{i,j} - L\,max}\right]. \quad (16)$$

The results stored in $ll_j$ are used to compute the final fitness score to evaluate mixture goodness and determine convergence of the EM.

Last, the likelihood metric must be converted into a weight that can be used to bias the update of the models, as follows:

$$w_{m,j} = \frac{e^{L_{m,j} - Lmax_j}}{\sum_{i=0}^m e^{L_{i,j} - Lmax_j}}. \quad (17)$$

Figure 6:
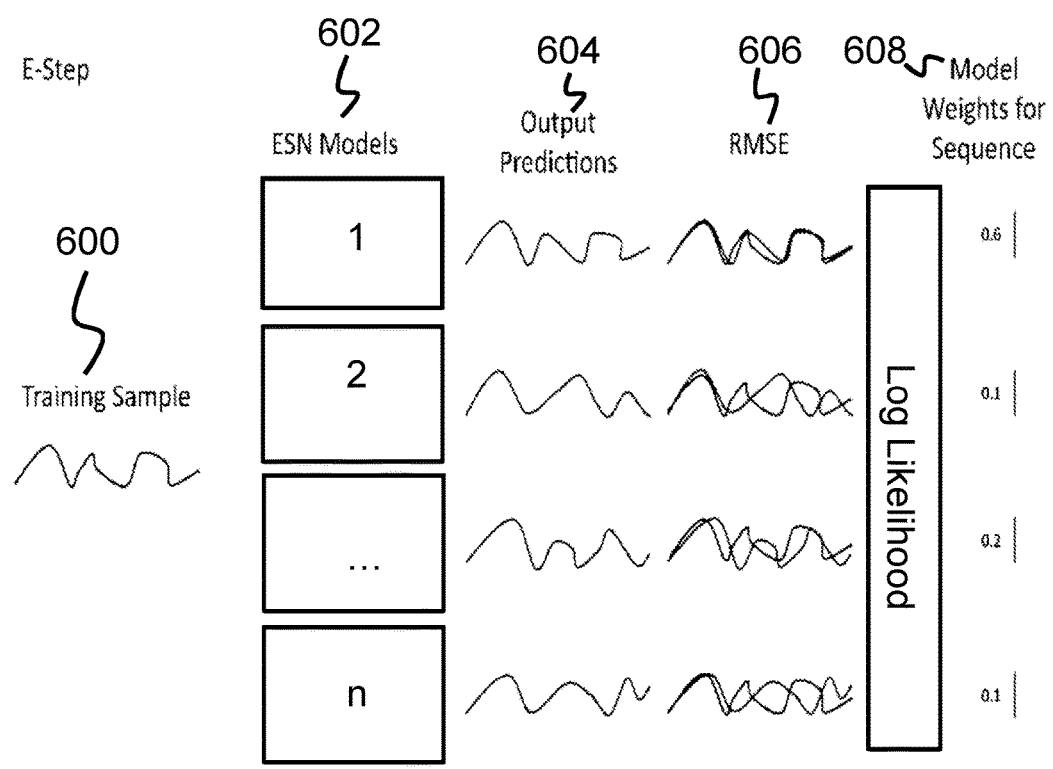
FIG. 6 is an illustration depicting a visual representation of the unique estimate step (E-step) used in the system and method according to various embodiments of the present invention.

This last item will be used to bias the model update. The higher this number, the more weight a sample will have in the model's update. Notably, w_(m,j) is the same weight used in equation (11). Also notice that the weights for any given sample sum to 1 across all models. The E step described here can be visualized in FIG. 6. As shown in FIG. 6, a training sample 600 is fed into each of the ESN models 602 that the system is trying to fit with the EM method. The prediction output 604 (e.g., predicted motion) from each ESN model 602 is compared with the true observed data (e.g., actual motion data) to measure the error (i.e., root mean squared error (RMSE) 606)) for each ESN model 602. That error 606 is then used to create a log-likelihood weight 608, which will be used to bias the update of the ESN models during the M-Step.

(4.2.2) M-Step

The M-Step includes taking the weights learned in the E-Step and applying them to retraining all the ESN models. The E-Step established an estimate for the error for each training sequence for each model; accordingly, when the models are updated, there will be more contribution to the new parameters from models that are better able to represent the data and less contribution from models that do a poor job of fitting.

Figure 7:
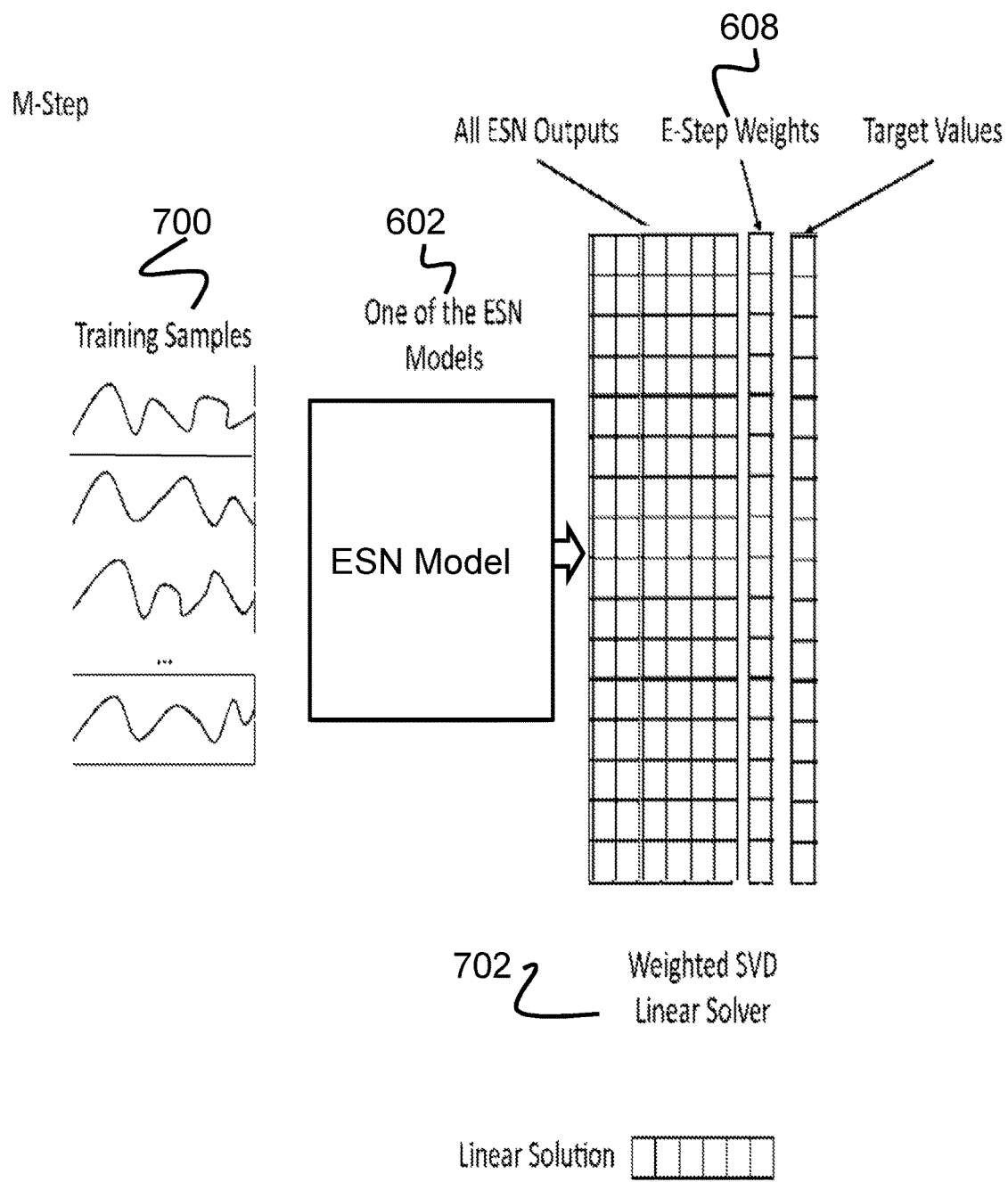
FIG. 7 is an illustration depicting a visual representation of the unique matrix step (M-step) used in the system and method according to various embodiments of the present invention.

FIG. 7 illustrates the M-Step. In the M-step and as shown in FIG. 7, all the ESN models are updated based on the weights 608 obtained in the E-Step. All training samples 700 are fit with the ESN models 602, but the ESN update is weighted 702 to bias in favor of samples an ESN was observed to fit better.

The models are accordingly updated with an application of the linear solution in Eq. (11), as follows:

$$A_m = (X^T \cdot w_m \cdot X)^{-1} \cdot X^T \cdot w_m \cdot Y, \quad (18)$$

where X is a matrix that contains the ESN outputs from all the training sequences over all time steps. If we have, e.g., 400 ESN neurons, 1 input feature, 100 training sequences and 512 frames per sequence, this matrix will be 51200×401 in size. Fortunately, modern machines with lots of memory can deal with such a matrix in a reasonable amount of time. The weight matrix $w_m$ was computed in the E-Step. We have one weight per model per sequence, but we need as many weights as we have rows in X. That is, we have 100 weights we can use here, but we need 51200. The weights are repeated for each frame in a sequence. As an example, the first 512 rows in X are from sequence 0. So we replicate $w_{m,0}$ 512 times for the first 512 rows in $w_m$. We do this for all the training sequences. The effect is that all frames in a given sequence have the same weight in updating a model. This means we assume that a models contribution to the generation of the sequence is static across time. For short time spanning sequences, this is probably a valid assumption. The result of the M-Step is a new set of $A_m$ linear models.

(4.2.3) Scoring and Convergence

The E-Step returns $ll_j$, which was computed in equation (16). A general goodness score is created by just summing the $ll_j$ for all sequences:

$$s = \sum_{i=0}^{samples} ll_i \quad (12)$$

The resulting value is the general log-likelihood score for all the models and all the sequences. To determine if the EM is converging, the system looks at the difference between the score for the current iteration and the score for the last one, $$\Delta_s = s_t - s_{t-1}. \quad (13)$$

If the change in the score is very small or negative, convergence is determined to have been achieved. As threshold, two conditions are used, either of which if true will end the EM loop and return a finished model. Condition 1 is as follows:

$$\Delta_s < -\epsilon. \quad (21)$$

Recall that $\epsilon$ is a very small number. It is the smallest positive number representable in floating points. The second condition is as follows:

$$\Delta_s < E \cdot |s_t|. \quad (22)$$

Here E is a constant small number (less than 0.001). While the first condition prevents the process from moving backwards, the second one quits if the change becomes small proportional to the score.

After convergence, the model set that had the best score is returned. If the new model at step t was worse than the one created at t−1, the model computed at t−1 is returned.

Next, the score must be regularized to eliminate singular results. No one model should get too much or too little of the weight from each sample sequence. A penalty term is derived to tack onto the score if a model received too little weight for training. First, the weights are summed for each model given each sequence, as follows:

$$\omega_m = \sum_{i=0}^{samples} w_{m,i}. \quad (23)$$

Next, all the resulting weights are summed, as follows:

$$\omega_a = \sum_{i=0}^{modles} \omega_i. \quad (24)$$

From these values, the penalty is computed as follows:

$$\Omega = \sum_{i=0}^{models} \left[\sin\left(\frac{\omega_i}{\omega_a} \cdot \pi\right)\right]^{-1} \cdot \xi. \quad (25)$$

This function is a U-shaped curve with very steep edges at 0 and 1. This characteristic forces a very high penalty for models that have almost all or almost none of the weight. Here, the regularizer bias is set as follows:

$$\xi = \frac{1}{2^{12}}. \quad (26)$$

This value is basically a small number. The smaller it is, the less the median results are regularized, and the more it is applied directly to extreme values. The penalty to the score for this ESN model set is thus defined as follows:

$$s' = \frac{s}{1+\Omega}. \quad (27)$$

Finally, the score is augmented by its Akaike information (see Literature Reference No. 10), as follows:

$$s_a = 2 \cdot \left[ M \cdot D \cdot \left( D + \frac{1}{2} \right) + M - 1 + M \cdot D \right] - 2 \cdot s'. \quad (28)$$

Here, M is the number of ESN models and D is the number of dimensions for each model. The Akaike score is derived for each permutation that is run. This score limits bias towards higher numbers of components, which is implicit in the EM algorithm. It is generally considered a more honest metric of how many components there should truly be in a given model set. For all the permutations with different numbers of components in a given generative type, the model set with the lowest Akaike score is selected.

(4.3) Generative Prediction and Classification

The ESN/EM protocol creates sets of models for the types of generators that speculatively underlie the observed behavior of agents. Since these are generative models, they generate an output that predicts an agent's behavior. The next step is to turn the prediction into a classification about the type of agent being observed. To do this, the error for each generative model is observed as it makes predictions about an agent. The one with the least degree of error by some metric is likely the generator that fits the agent the best. Once a lowest degree of error generator is selected, the agent can be labeled as being of the same type as the generator.

Figure 8:
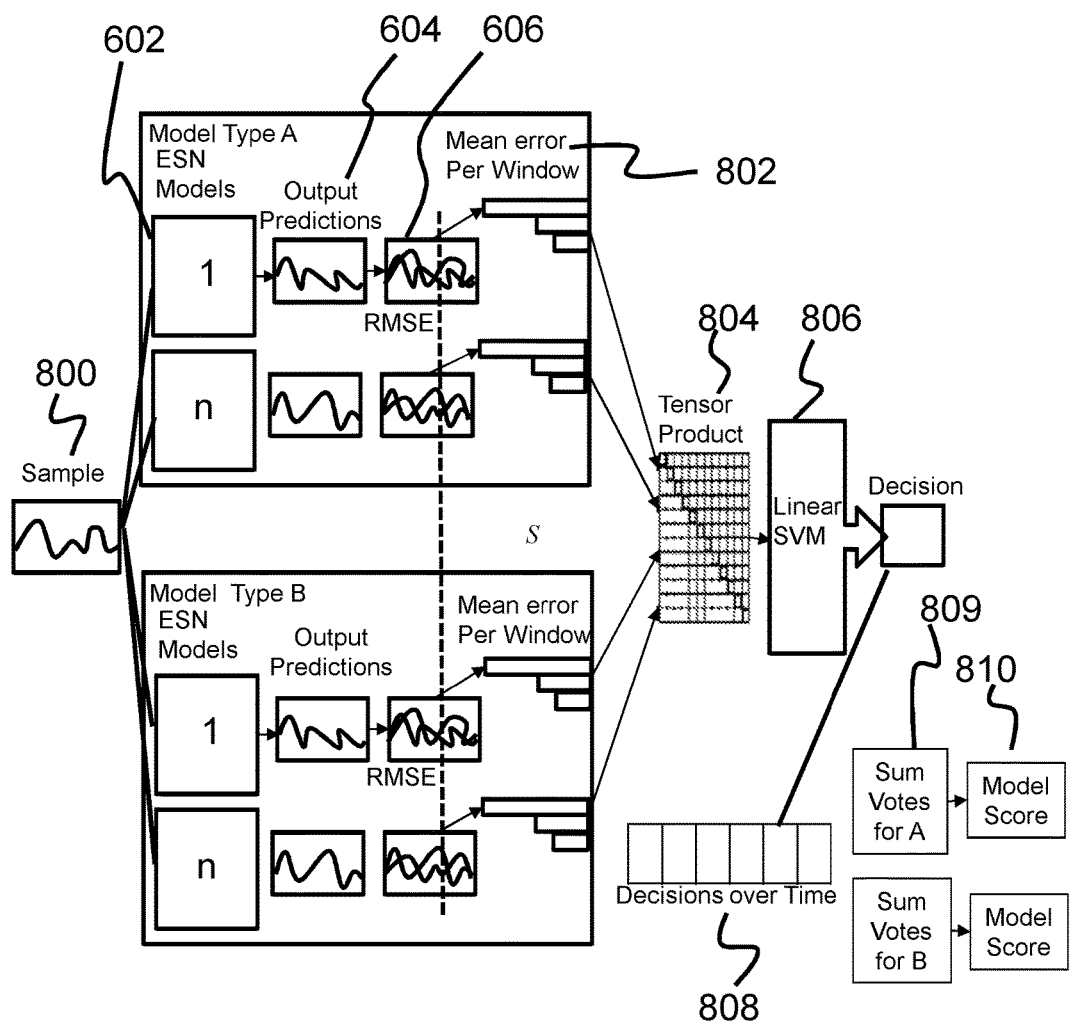
FIG. 8 is an illustration depicting a visual representation of a Support Vector Machine (SVM) according to various embodiments of the present invention.

To make the prediction error robust with respect to the size of the time window in which the error is recorded, different time slices of errors are taken and integrated into a multi-factored decision. FIG. 8 illustrates how to turn the model generative predictions into a decision about the type of actor being observed. As shown in FIG. 8, data 800 is run on all the ESN models 602 that were created during the EM step. The output 604 from the ESN models 602 is used to compute the errors (i.e., RMSE 606) in prediction. The mean error per window 802 size are then combined as a tensor product 804 and fed into the SVM classifier 806. This classification is used to determine what type of actor is being observed (e.g., model type A or B). Making several of these classification judgments over time 808 allows the system to tally 809 votes over time to generate a model score 810 for a particular classification of an agent. If a model score 810 exceeds a predetermined threshold for a particular classification, then the agent is classified as based on the particular model score 810 that exceeds the threshold.

For further understanding, given an instant in time, the root mean squared error (RMSE) 606 is taken over varying window sizes 802 for all models and all types. To increase the interactivity, the tensor product 804 of all the RMSE 606 values over all time slices is taken. The results are used as the input features for a support vector machine (SVM) 806 (an example of an SVM can be found in Literature Reference No. 1). The result of the SVM 806 is used as a vote. Within a larger block of time, votes are accumulated (i.e., as a model score 810). Once there are enough votes for one type of agent (e.g., the model score exceeds a predetermined threshold), the actor can be labeled. The predetermined threshold depends on application and is empirically chosen, e.g., by optimizing the number of correct labels in a test set. Without implying a limitation, the number of votes for one type of agent may be 30 as discussed in the Experimental Results below.

For example, input data frames are split in chunks of 512. This is considered the minimum block usable for deriving votes as well as training the generators. If 32 frames per second of input are received, these chunks make a 16 second window. From this block of 512 frames, 15 randomly placed samples are taken. Each of these randomly placed samples is used to generate one vote. This protocol loosely resembles a sliding window protocol with histograms of model fitness over different windows of data (see Literature Reference No. 12 for a description of such a sliding window protocol).

Each of the 15 samples contains a set of RMSE over different windows for all models. Windows are sampled in dyadic intervals. For example, if there are four windows at time t, window 1 is comprised of samples from t−4 to t, window 2 is samples from t−9 to t, window 3 is samples from t−19 to t and window 4 would be t−39 to t (the window sizes are 5, 10, 20 and 40). For a given window, the RMSE per model is defined as follows:

$$\rho_{m,\theta,t} = \sqrt{\frac{\sum_{i=0}^{t} (\hat{y}_{m,\theta,i} - y_i)^2}{t}}. \quad (29)$$

This is the RMSE $\rho_{m,\theta}$ for model m given the type of model $\theta$ over an interval of t frames given the output estimate from the model $\hat{y}_{m,\theta,i}$ and the true observed output $y_i$. The estimate given by $\hat{y}_{m,\theta,i}$ was created several frames before the observation $y_i$ was made. Thus, the models made a prediction x number of frames in the future. Thus, it is necessary to wait that many frames to measure how well the models did. Next, a simple normalization is performed to force all elements in ρ to range from 0 to 1 (the window with the most error has a value of 1, and the window with the least error a value of 0), as follows:

$$\|\rho\| = \frac{\rho - \rho_{min}}{\rho_{max} - \rho_{min}}. \quad (30)$$

Given all normalized RMSE values over all models and all model types, a tensor product is defined as:

$$P = \sqrt{\|\rho\| \otimes \|\rho\|}, \quad (31)$$

where P contains all normalized RMSE results for all models and all types multiplied by all others and itself. The square root is taken over each value to maintain linearity. Thus, if there are a total of n windows, n×n values will be obtained as a result. The end product is a square matrix. The lower triangle component is redundant and can be omitted. Thus, the actual amount of new values created is:

$$n + \lfloor n^2/2 \rfloor - \lfloor n/2 \rfloor. \tag{32}$$

The values in the matrix P excluding the lower triangle are used as inputs to the machine learning classifier. So long as there is a sufficiently large training set compared to the number of windows and models, this increase in dimension should not create new problems. The multitude of elements in P allows the classifier to delineate imperfections in the generative models so that if the agent exhibits a combination of generative behaviors, a prediction can still be made Thus, while a model based on the notion of single generators during EM is attempted, combinations of generators are allowed for at the prediction phase. To train and later run the SVM classifier, all non-redundant elements in P are taken and turned into a row of training data. For each sample block of 512 frames, 15 rows of training data are created. The target value for the support vector machine is the model type. An example for an implementation of SVM is the linear nu-SVC classifier from libSVM (see Literature Reference No. 13). The default parameters are used except for v, which is set to 0.1 instead of 0.5.

(4.4) Experimental Results

Figure 9:
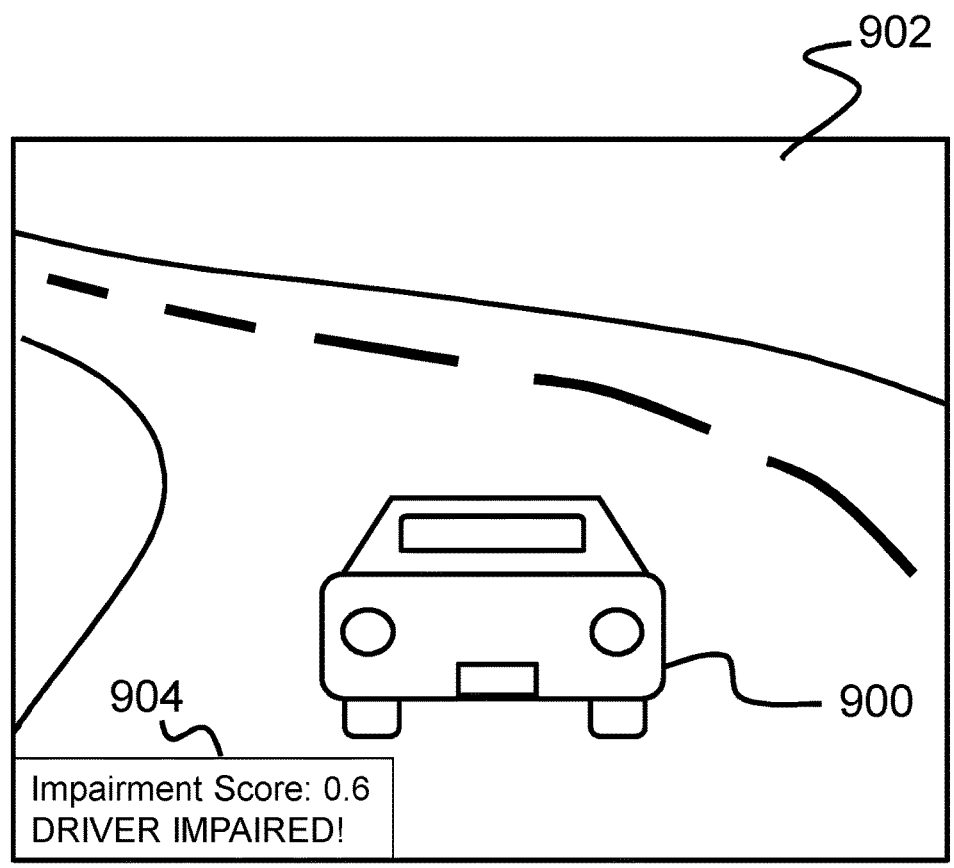
FIG. 9 is a screenshot from The Open Racing Car Simulator (TORCS), in a simulation where the system according to various embodiments of the present invention is used to detect the impairment level of an agent, and in particular, a driver.

To demonstrate the function of the system as described herein, a computer simulation was performed. In this simulation, an autonomous system observed a car and had to judge if an impaired driver operated the car in front. Training data was collected by simulating sober and impaired driving. As a test bed, the open source TORCS (see Literature Reference No. 14) driving simulator was used. As shown in FIG. 9, a simulated car 900 was placed on different tracks and attempted to either drive normally or impaired. The example screen shot 902 from the simulator shows a positive impairment score 904, which for these scene correctly identifies that the driver in the vehicle 900 is impaired.

Telemetry from the car was recorded at a rate of 32 samples per second. Four training sessions were recorded for the sober and four from the impaired condition. Each session used a different track. The training tracks were not used in the testing sessions. Two different car models were used with different handling characteristics. 58 blocks of 512 frames from the impaired driving sessions and 49 from the sober driving sessions are extracted. Blocks did not overlap, and the difference between the numbers in the two conditions resulted from the impaired driving sessions tending to be slightly longer even though the same distance was covered.

The input training data was the distance of the vehicle from the right curb. The target for training was the distance from the curb 1 second in the future (32 frames). Thus, the input value is the distance from the curb at time t and the target for learning was the distance from the curb at time t+32. First, the ESN was trained for generative models using the training data. Each ESN had 400 reservoir neurons with different memories defined using equation (4). No tuning was done to the ESN model parameters in this experiment. For EM training, 1000 permutations were tested for each number of ESN models. 1 to 6 models were tried per model type. In the 1 model condition, only one permutation was used, since the omission of EM was permissible; accordingly, a direct solution the linear solution could be attempted. Since two types of models are made use of, in all, 5×2×1000+2 permutations were tried. As mentioned, the ESN reservoir was kept the same for all models. Only the initial linear weights for A were permuted.

Once the ESN models were trained, the SVM learner was trained to distinguish the type of driver from the training data and the newly created ESN generative models. Using the protocol of taking 15 samples per block of 512 frames, this created 870 impaired-driver training samples and 735 sober-driver training samples. The SVM training data used 5 dyadic window sizes 5, 10, 20, 40 and 80 frames. The EM/ESN model builder decided, from here, to create 4 impaired driver models and 2 sober driver models. Thus, the input vector p had 30 values, which after using the tensor product yielded 465 values. No parameter tuning was done on the training data for window sizes or the SVM. Parameters were turned on an earlier set of sham data comprised of ad-hoc non-linear functions. As such, the results did not suffer from extraordinary efforts to fit the data.

Testing sequences are created in the same way as the training sequences. They included six driving sessions from six different tracks for impaired and sober driving conditions (12 in total). This yielded 60 sober testing blocks and 71 impaired testing blocks of 512 frames. In total 131 blocks were tested, which adds up to a total of about 35 minutes of driving. For voting over single blocks, sober drivers are correctly identified 86.6% of the time, impaired drivers are correctly identified 98.59% of the time. If blocks are combined by twos to create 32-second blocks with 30 votes, much better accuracy is achieved. 98.3% of sober drivers are identified correctly and 100% of impaired drivers are identified correctly. As such, the optimal block size (i.e., block of time) for detection in this task is somewhere between 16 and 32 seconds.

Figure 10:
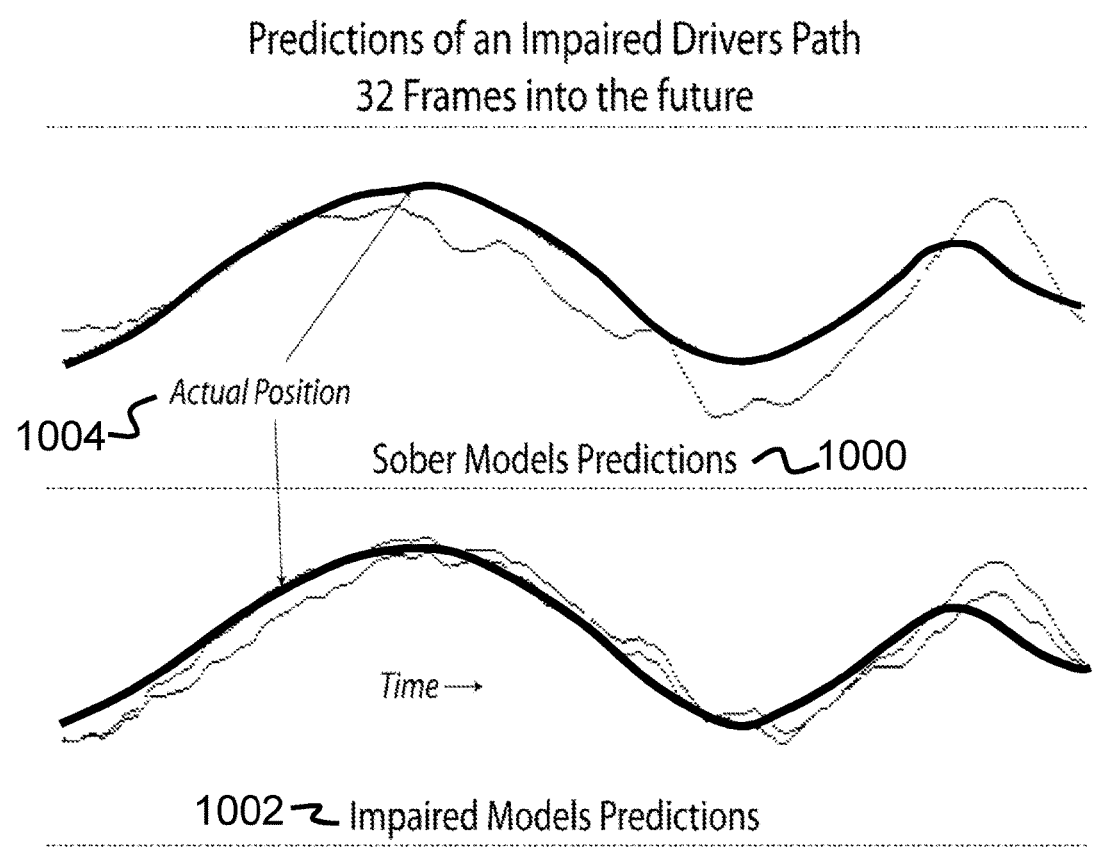
FIG. 10 is a graph of a prediction by several trained models on a testing block, where the input is the distance from the curb of an impaired driver and of a sober driver.

Qualitatively, the generative models appear to resemble the target they are supposed to predict. FIG. 10 shows a typical example of the generative prediction of an actor over a sample block of 512 frames. The input is the distance from the curb of an impaired driver. It can be seen that the driver is swerving. The sober model predictions 1000 at the top do not match as closely as the impaired models 1002 on the bottom do. Note in this case, the EM method has created two sober driver models and four impaired driver models. The actual observed position 1004 is shown in heavier weighted lines as it occurs 32 frames following the prediction Sober model predictions of impaired drivers appear to predict either a strong over-correction or a desire to stay in the new lane when the impaired driver swerves. Thus, it seems to either overestimate or under estimate correction. On the other hand, impaired model predictions of sober driving showed oscillations. Here, it appears to be over anticipating an erratic driving pattern.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for classifying agents based on agent movement patterns, the system comprising:
one or more processors and a memory, the memory being a non-transitory computer-readable medium having executable instructions encoded thereon, such that upon execution of the instructions, the one or more processors perform operations of:
receiving position data of a moving agent;
extracting motion data of the moving agent from the position data;
generating a predicted future motion of the moving agent using a set of recurrent neural networks, each recurrent neural network representing an agent classification and generating a predicted future motion;
generating a prediction error for each recurrent neural network by comparing the predicted future motion for each recurrent neural network with actual motion data;
classifying the agent based on the recurrent neural network having a smallest prediction error; and
wherein the system is implemented in an autonomous vehicle with at least one recurrent neural network being associated with an agent classification, such that if the agent is classified as a particular agent type, the system causes the autonomous vehicle to initiate a precautionary protocol.

2. The system as set forth in claim 1, further comprising a sensor for generating position data of the moving agent, the sensor being selected from a group comprising a camera and a LASER range finder.

3. The system as set forth in claim 1, wherein the agent is classified using a classifier, the classifier operating on prediction errors of an agent's movement evaluated over a series of time intervals.

4. The system as set forth in claim 1, wherein generating the prediction error and classifying the agent further comprises operations of:
generating, for an instant in time, a root mean squared error (RMSE) value over varying window sizes for each recurrent neural network;
generating a tensor product of all the RMSE values over all time slices;
passing the tensor product through the support vector machine to generate votes for each recurrent neural network; and
accumulating the votes for a block of time to generate a model score for each recurrent neural network, such that when the model score for any particular recurrent neural network exceeds a predetermined threshold, the agent is classified based on the recurrent neural network having the largest model score.

5. The system as set forth in claim 1, further comprising an operation of training each recurrent neural network on sample movements of an agent.

6. The system as set forth in claim 1, wherein each recurrent neural network is an Echo State Network.

7. The system as set forth in claim 1, wherein each recurrent neural network is trained with an Expectation Maximization (EM) process, the EM process comprising operations of:
computing the prediction error of each recurrent neural network for each input sample;
computing a score for each recurrent neural network based on a goodness of fit score of its prediction and penalizing against a goodness of fit score of predictions of other recurrent neural networks for each input sample; and
optimizing parameters of the recurrent neural networks based on the computed scores for each recurrent neural network.

8. The system as set forth in claim 1, wherein each recurrent neural network is trained with an Expectation Maximization (EM) process, and wherein the EM process further optimizes a number of recurrent neural networks describing each class of movement patterns.

9. A computer program product for classifying agents based on agent movement patterns, the computer program product comprising:
a non-transitory computer-readable medium having executable instructions encoded thereon, such that upon execution of the instructions by one or more processors, the one or more processors perform operations of:
receiving position data of a moving agent;
extracting motion data of the moving agent from the position data;
generating a predicted future motion of the moving agent using a set of recurrent neural networks, each recurrent neural network representing an agent classification and generating a predicted future motion;
generating a prediction error for each recurrent neural network by comparing the predicted future motion for each recurrent neural network with actual motion data;
classifying the agent based on the recurrent neural network having a smallest prediction error; and
wherein the system is implemented in an autonomous vehicle with at least one recurrent neural network being associated with an agent classification, such that if the agent is classified as a particular agent type, the system causes the autonomous vehicle to initiate a precautionary protocol.

10. The computer program product as set forth in claim 9, wherein the agent is classified using a classifier, the classifier operating on prediction errors of an agent's movement evaluated over a series of time intervals.

11. The computer program product as set forth in claim 9, wherein generating the prediction error and classifying the agent further comprises operations of:
generating, for an instant in time, a root mean squared error (RMSE) value over varying window sizes for each recurrent neural network;
generating a tensor product of all the RMSE values over all time slices;
passing the tensor product through the support vector machine to generate votes for each recurrent neural network; and
accumulating the votes for a block of time to generate a model score for each recurrent neural network, such that when the model score for any particular recurrent neural network exceeds a predetermined threshold, the agent is classified based on the recurrent neural network having the largest model score.

12. The computer program product as set forth in claim 9, further comprising instructions for causing the one or more processors to perform an operation of training each recurrent neural network on sample movements of an agent.

13. The computer program product as set forth in claim 9, wherein each recurrent neural network is an Echo State Network.

14. The computer program product as set forth in claim 9, wherein each recurrent neural network is trained with an Expectation Maximization (EM) process, the EM process comprising operations of:
- computing the prediction error of each recurrent neural network for each input sample;
- computing a score for each recurrent neural network based on a goodness of fit score of its prediction and penalizing against a goodness of fit score of predictions of other recurrent neural networks for each input sample; and
- optimizing parameters of the recurrent neural networks based on the computed scores for each recurrent neural network.

15. The computer program product as set forth in claim 9, wherein each recurrent neural network is trained with an Expectation Maximization (EM) process, wherein the Expectation Maximization process further optimizes a number of recurrent neural networks describing each class of movement patterns.

16. A system for training a set of Echo State Network (ESN) models for classification, the system comprising:
- one or more processors and a memory, the memory being a non-transitory computer-readable medium having executable instructions encoded thereon, such that upon execution of the instructions, the one or more processors perform operations of:
  - computing a prediction error of each ESN model for each input sample, each input sample having motion pre-classified as an agent type;
  - computing a score for each ESN model based on a goodness of fit score of its prediction and penalizing against a goodness of fit score of predictions of other ESN models for each input sample;
  - optimizing parameters of the ESN models based on the computed scores for each ESN model to associate the ESN models with the agent types;
  - classifying the agent based on ESN models; and
  - wherein the system is implemented in an autonomous vehicle with at least one ESN being associated with an agent classification, such that if the agent is classified as a particular agent type, the one or more processors cause the autonomous vehicle to initiate a precautionary protocol.

17. A computer program product for training a set of Echo State Network (ESN) models for classification, the computer program product comprising:
- a non-transitory computer-readable medium having executable instructions encoded thereon, such that upon execution of the instructions by one or more processors, the one or more processors perform operations of:
  - computing a prediction error of each ESN model for each input sample, each input sample having motion pre-classified as an agent type;
  - computing a score for each ESN model based on a goodness of fit score of its prediction and penalizing against a goodness of fit score of predictions of other ESN models for each input sample;
  - optimizing parameters of the ESN models based on the computed scores for each ESN model to associate the ESN models with the agent types;
  - classifying the agent based on ESN models; and
  - wherein the system is implemented in an autonomous vehicle with at least one ESN being associated with an agent classification, such that if the agent is classified as a particular agent type, the one or more processors cause the autonomous vehicle to initiate a precautionary protocol.

18. A method for classifying agents based on agent movement patterns, the method comprising acts of:
- receiving position data of a moving agent;
- extracting motion data of the moving agent from the position data;
- generating a predicted future motion of the moving agent using a set of recurrent neural networks, each recurrent neural network representing an agent classification and generating a predicted future motion;
- generating a prediction error for each recurrent neural network by comparing the predicted future motion for each recurrent neural network with actual motion data;
- classifying the agent based on the recurrent neural network having a smallest prediction error; and
- wherein the system is implemented in an autonomous vehicle with at least one recurrent neural network being associated with an agent classification, such that if the agent is classified as a particular agent type, the system causes the autonomous vehicle to initiate a precautionary protocol.

* * * * *